United States Patent [19]
Hagenbuch

[11] Patent Number: 5,887,914
[45] Date of Patent: Mar. 30, 1999

[54] VEHICLE IN-SERVICE/OUT-OF-SERVICE ROTATABLE TAILGATE MECHANISM

[76] Inventor: LeRoy G. Hagenbuch, 502 W. Northgate Rd., Peoria, Ill. 61614-2042

[21] Appl. No.: 477,730

[22] Filed: Jun. 7, 1995

Related U.S. Application Data

[63] Continuation-in-part of Ser. No. 159,670, Nov. 30, 1993, Pat. No. 5,474,363.

[51] Int. Cl.$^6$ ........................................................ B60P 1/26
[52] U.S. Cl. .................... 298/23 R; 296/184; 298/23 DF
[58] Field of Search .......................... 296/184; 298/23 R, 298/23 A, 23 D, 23 F, 23 MD

[56] References Cited

U.S. PATENT DOCUMENTS

| | | |
|---|---|---|
| 3,272,552 | 9/1966 | Park . |
| 3,720,446 | 3/1973 | Kelley .................... 298/22 R |
| 3,751,112 | 8/1973 | Hagenbuch . |
| 3,905,493 | 9/1975 | Logue . |
| 3,905,616 | 9/1975 | Tamburino et al. ................. 298/15 G |
| 4,050,734 | 9/1977 | Richard . |
| 4,071,277 | 1/1978 | Stedman .................. 296/184 |
| 4,323,279 | 4/1982 | Domes et al. . |
| 4,348,055 | 9/1982 | Meisner et al. . |
| 4,531,781 | 7/1985 | Hunt et al. .............. 296/184 |
| 4,621,858 | 11/1986 | Hagenbuch . |
| 4,678,235 | 7/1987 | Hagenbuch . |
| 5,100,279 | 3/1992 | Bjerk ..................... 298/23 D |
| 5,228,750 | 7/1993 | Hagenbuch . |

FOREIGN PATENT DOCUMENTS

| | | |
|---|---|---|
| 913876 | 6/1954 | Germany . |
| 98789 | 4/1940 | Switzerland . |
| 595516 | 12/1947 | United Kingdom . |

Primary Examiner—Karen B. Merritt
Assistant Examiner—Gregory A. Morse
Attorney, Agent, or Firm—Leydig, Voit & Mayer, Ltd.

[57] ABSTRACT

A load-carrying body for a truck is provided that includes a tailgate assembly positionable between in-service and out-of-service positions for hauling materials of different densities while maintaining a controlled distribution of the weight of the load on a chassis of the truck. Preferably, the body and the tailgate assembly are designed so that the centers of gravity or centers of mass of normal loads for both low and high density materials are located to achieve a desired weight distribution for both materials. Physical parameters of the body and tailgate are adjusted in accordance with the invention in order to place the fore-aft locations of the centers of mass for normal loads of both the low and high density materials at locations that result in the desired weight distribution on the truck chassis.

18 Claims, 16 Drawing Sheets

STEP 9.

Composite coal (light material) and overburden (dense material) "Dual Purpose" Body.

STEP 1.

Start with truck chassis drawn as a scaleable drawing

STEP 2.

Using truck chassis empty and loaded weights establish "load" center of gravity.

STEP 3.

Establish proposed body floor line.

STEP 4.

Established proposed front slope line.

STEP 5.

A. Determine overburden (dense material) density typically 2500-2850 pounds per cubic yard.

B. Determine overburden (dense material) Heap 1:1; 2:1; 3:1 ect. - typically 2:1.

C. Determine inside body width typically 100-115% of the overall rear axle tire width.

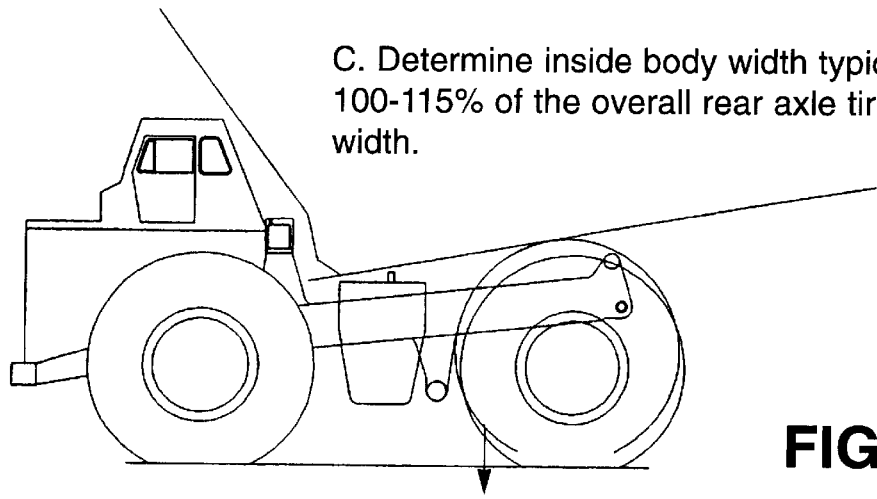

FIG. 10A

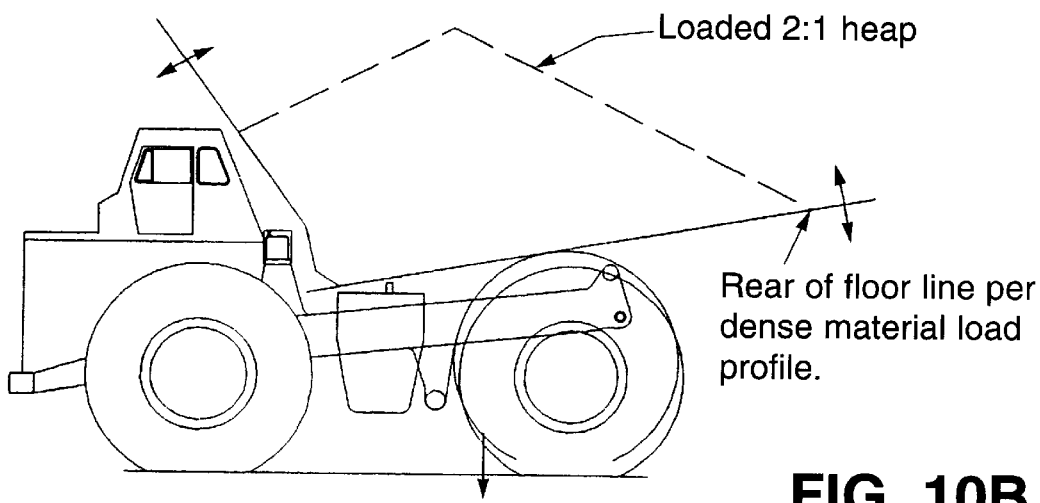

Loaded 2:1 heap

Rear of floor line per dense material load profile.

FIG. 10B

STEP 6.

Establish overburden (dense material) load profile adjusting body floor line and front slope line as needed to obtain correct dense "Load" center of gravity.

FIG. 11A

STEP 7.

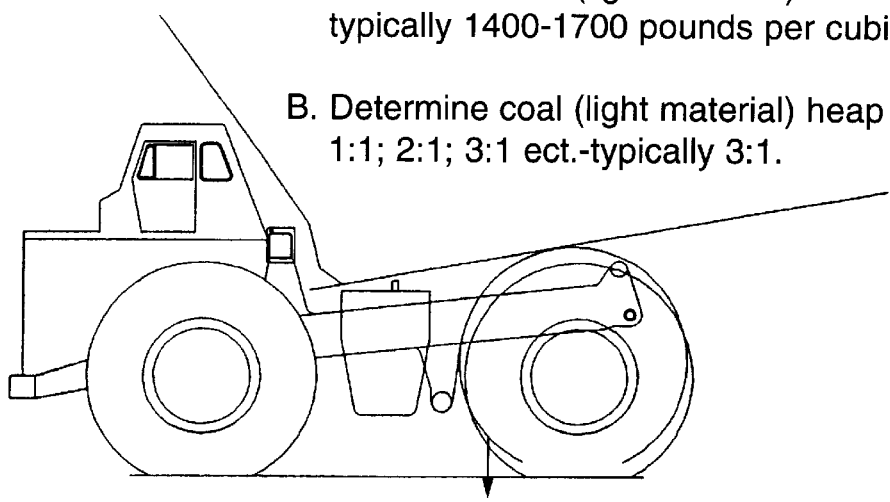

A. Determine coal (light material) density typically 1400-1700 pounds per cubic yard.

B. Determine coal (light material) heap 1:1; 2:1; 3:1 ect.-typically 3:1.

FIG. 11B

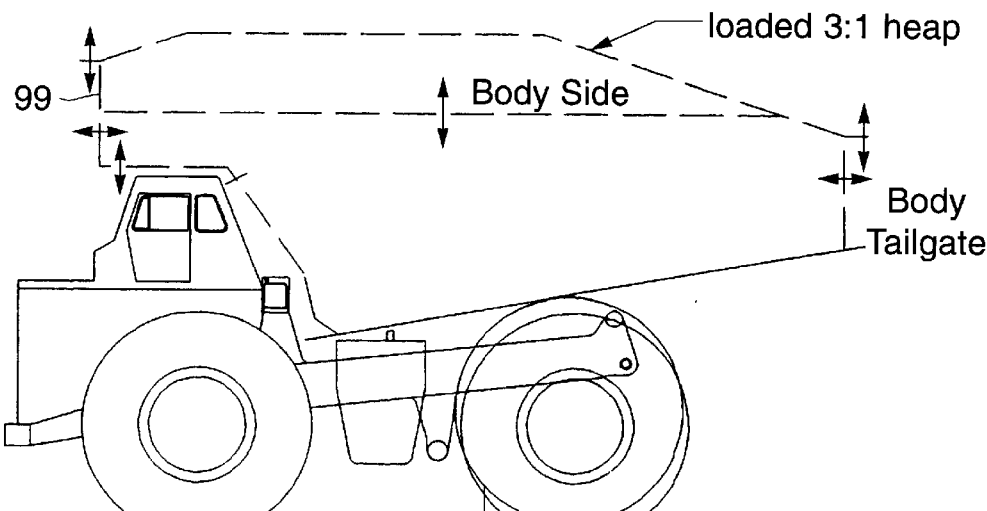

STEP 8.

Using a rear of floor line point (with slight freeboard) as established by the dense material load profile establish coal (light material) load profile.

Adjust the body side height, tailgate location, and body front slope line (above where the overburden (dense material) contacts the front slope line) to obtain correct light "Load" center of gravity.

loaded 3:1 heap Light material.

loaded 2:1 heap Dense material.

⊕ Light Mtrl.
⊕ Dense Mtrl.

STEP 9.

Composite coal (light material) and overburden (dense material) "Dual Purpose" Body.

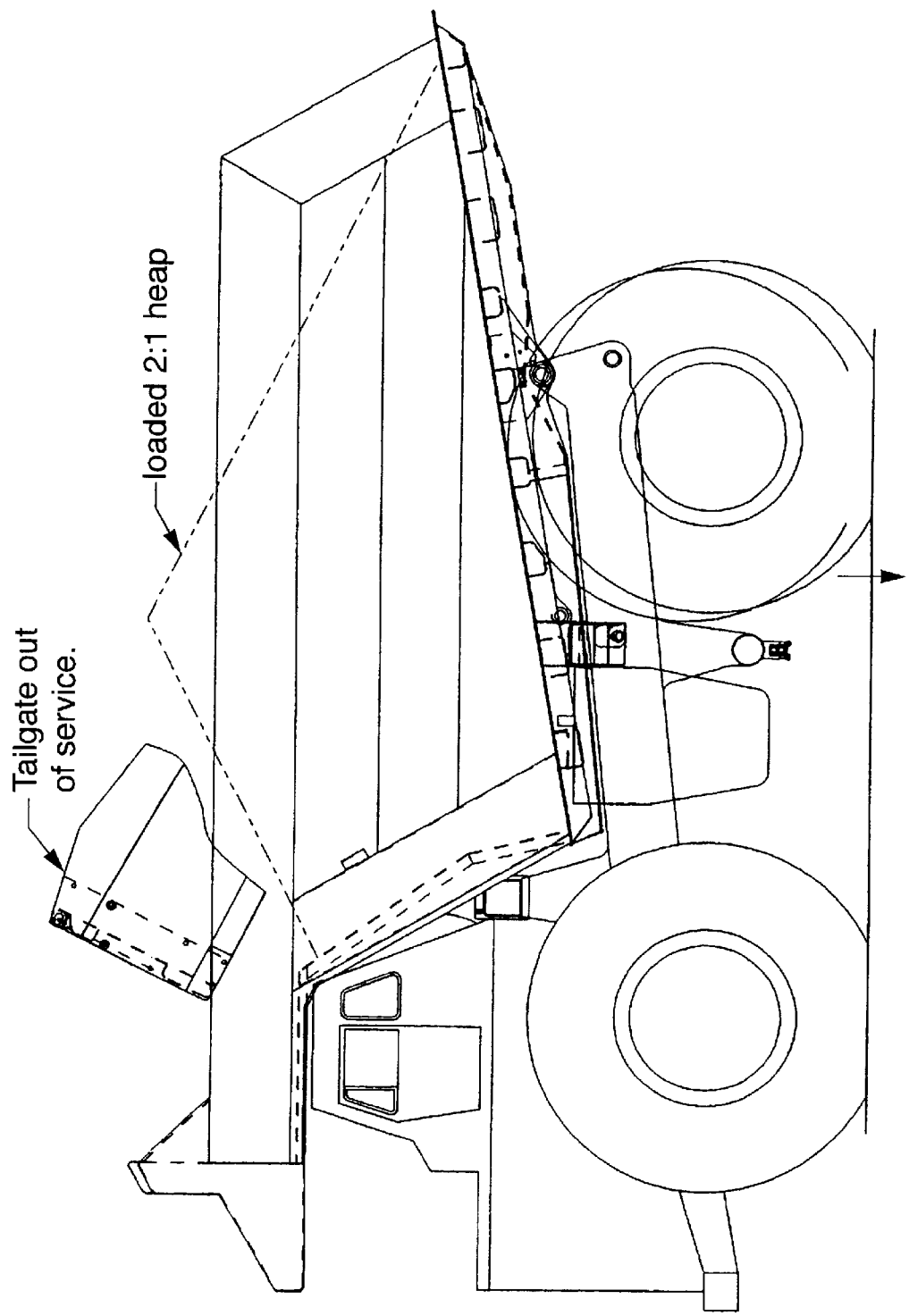

VEHICLE IN-SERVICE/OUT-OF-SERVICE ROTATABLE TAILGATE MECHANISM

This application is a continuation-in-part of U.S. Ser. No. 08/159,670 filed Nov. 30, 1993, now U.S. Pat. No. 5,474,363.

FIELD OF THE INVENTION

The present invention relates generally to heavy-duty, off-road trucks and, more particularly, to the operation of the tailgates for these off-road trucks.

BACKGROUND OF THE INVENTION

In the working environment of a coal mine, off-road trucks may be used to haul both coal and overburden. Overburden, which is the earth (rock and dirt) which must be removed in surface coal mining operations to expose the coal seams for mining, typically has a greater density than the coal being mined.

The difference in material density between coal and overburden has created problems for mine operators. When hauling the higher density overburden in heavy-duty off-road trucks having bodies with tailgate assembly sized to haul coal, the load may substantially exceed the allowable gross vehicle weight rating of the off-road truck if the coal-rated bodies with tailgate assembly are filled to their full volume capacity. In off-road trucks having overburden-rated truck bodies, the truck bodies are sized to minimize the possibility of overloading the truck when hauling overburden. The reduced volumetric capacity of the overburden-rated truck body, however, prevents the off-road truck from hauling its maximum allowable gross vehicle weight-rated capacity in lighter density coal. When the lighter weight coal is hauled, sometimes less than half of the allowable payload capacity of the off-road truck may be utilized.

Although some mine operators employ a fleet of off-road trucks comprising one group of off-road trucks equipped with the overburden-rated, smaller volume bodies and a second group of off-road trucks equipped with the coal-rated, larger volume truck bodies, the dedication of trucks to a particular type of hauling task in total reduces the versatility of a mine operator's fleet because, at different times during the mining cycle, there may be a need for more off-road trucks to haul overburden while, at other times, there may be a need for more off-road trucks to haul coal. Thus, the mine operator must face the unpleasant choice of either operating the off-road trucks inefficiently when hauling coal by using a smaller volume overburden-rated truck body or, alternatively, if a larger volume coal-rated truck body with tailgate assembly is utilized for hauling overburden, the truck body can easily, if fully loaded with heavier overburden, cause off-road truck overloading. Obviously, dedicating the off-road truck fleet to groups intended for hauling different types of materials reduces the flexibility of the fleet and increases the possibility of inefficient fleet operation.

A solution to the problem of reducing off-road truck fleet flexibility when needing different size truck bodies has been to selectively utilize a tailgate assembly with truck bodies in order to adjust the volumetric capacity of the truck body. In truck bodies designed for the dual purpose of hauling both coal and overburden, it becomes essential that a tailgate assembly be utilized due to body length and height constraints and the heaping nature of the coal being hauled. By utilizing a tailgate with the truck body, the volumetric capacity and the corresponding load capabilities of the truck body can be designed to the proper capacity for hauling coal, while the removal of the tailgate permits the volumetric capacity of the truck body to be reduced for hauling overburden.

Unfortunately, the addition of a tailgate to a truck body poses some potential disadvantages if used when hauling overburden on a truck body primarily designed for hauling coal. The tailgate can interfere with the loading operation of a truck if, when loading with a loading shovel, the loading shovel must raise the loading shovel bucket over the tailgate. This situation is justified for loading coal because of the additional load capacity provided by the tailgate. However, additional capacity is typically not needed with a coal/overburden truck body tailgate assembly combination when hauling overburden. And, when loading overburden with a loading shovel, the height of the tailgate creates a risk that overburden may be dropped into the truck body from a greater height.

One attempt to remedy the challenges created by selective use of a tailgate is described in U.S. Pat. No. 4,621,858 issued to LeRoy G. Hagenbuch on Nov. 11, 1986 which describes a tailgate rotatable between a closed, in-service position at the rear of the coal hauling truck bed for increasing the volumetric capacity of the truck body and an out-of-service position at the front of the truck body for reducing volumetric capacity of the truck body for use in hauling overburden and other high density material. In the out-of-service position, the tailgate does not affect the operation of the loading shovel. The means for rotating the tailgate between the in-service and out-of-service position utilizes the center of gravity of the tailgate relative to a vertical axis through the tailgate pivot point such that the tailgate rotates to the out-of-service position when the tailgate center of gravity is forward of the vertical axis of the tailgate pivot point and to the closed, in-service position when the tailgate center of gravity is rearward of the vertical axis of the tailgate pivot point.

Unfortunately, the tailgate assembly described in U.S. Pat. No. 4,621,858 has several disadvantages. The rotating of the tailgate between in-service and out-of-service position of the tailgate is adversely affected when the truck is operated on adverse grades because the position of the tailgate center of gravity with the truck body raised changes relative to the vertical axis through the tailgate pivot point depending on truck grade placement (parked up hill, parked down hill).

In addition, in rotating the tailgate assembly between the in-service closed and out-of-service positions, the rotation of the tailgate is uncontrolled for a brief part of its travel. During this brief period of uncontrolled tailgate rotation, gravity causes the tailgate to accelerate in the rotation, gathering some momentum, creating forces and stresses which can adversely affect the tailgate. Additionally, this method of tailgate rotation requires hooking, unhooking, and reeving of the tailgate actuation chain by either the truck operator leaving the truck cab or a second individual on the ground—something that both raises hazards and complicates the process of moving the tailgate from the in-service to out-of-service positions.

OBJECTS AND SUMMARY OF THE INVENTION

It is a general object of this invention to provide a truck body with selective tailgate usage capabilities for heavy-duty, off-road trucks which can efficiently haul loads of different volumes and material densities.

It is a more specific object of this invention to provide a truck body for heavy-duty, off-road trucks which selectively utilizes a tailgate without introducing possible inefficiencies into the hauling operation and which minimizes the possible risk of overloading the heavy-duty, off-road truck with high density materials.

It is another object of the invention to provide an improved tailgate for the truck body of a heavy-duty, off-road truck which minimizes any interference with the loading of high density materials and which minimizes the risk of damaging the heavy-duty, off-road truck when loaded with the high density material.

It is yet another object of the invention to provide the foregoing objectives while providing a tailgate which increases the volumetric capacity of a truck body for a heavy-duty, off-road truck.

Another object of the invention is to provide a tailgate assembly in which the rate of rotation is controlled throughout the entire arcuate path as it moves between in-service and out-of-service positions.

A further object of the present invention is to provide a tailgate assembly which in normal tailgate in-service operation is rotated by a cable or chain which does not drag on the ground and otherwise interfere with the operation of the heavy-duty, off-road truck when the tailgate is in the out-of-service position.

A related object of the present invention is to provide a tailgate assembly which does not require the operator to leave the cab of the heavy-duty, off-road truck in order to rotate the tailgate between in-service and out-of-service positions, thereby enhancing the safety of the heavy-duty, off-road truck.

Still another object of the invention is to provide a dual-purpose truck body for alternatively carrying relatively low or high density material in a manner that distributes the weight of a full load to best complement the design of the truck frame or chassis.

To achieve the foregoing and other objects, the present invention provides a tailgate assembly which rotates between in-service and out-of-service positions on a truck body of an off-road, heavy duty truck. The tailgate assembly includes opposing side beams attached at their first ends to a tailgate. The opposing side beams are pivotally connected to opposing side walls of the truck body such that the tailgate assembly is capable of rotating about an axis of rotation intersecting both truck body side walls. A first tailgate rotation actuation assembly rotates the tailgate assembly between a closed, in-service position and an open in-service position wherein the load is dumped from the truck body. In one embodiment, the first tailgate actuation assembly comprises a chain connected to the tailgate assembly at a first end and operatively connected to the truck frame at a second end to rotate the tailgate assembly in response to the rotation of the truck body between the closed, in-service lowered and in-service raised positions. A second tailgate rotation actuation assembly rotates the tailgate assembly between the open in-service position and the out-of-service position in which the tailgate assembly rests on the canopy of the body. In one embodiment, the second tailgate actuation assembly comprises an actuating cylinder for positioning a cam into engagement with the tailgate assembly and for exerting a rotating torque on the tailgate. Additionally, the second tailgate actuation assembly locks the tailgate assembly in the out-of-service position.

By rotating the tailgate between in-service and out-of-service positions, the body effectively is a dual-purpose body, well suited for carrying loads of either relatively low or high densities. In this regard, another aspect or feature of the invention provides a process for designing the body so that full loads of either relatively low or high density material normally tends to be distributed in the body such that the center of gravity of the load aligns with a vertical reference on the chassis. This vertical reference is preferably the proximate center of gravity for a load assumed by the original equipment manufacturer in designing the chassis, which supports the body and its load.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIGS. 8–11 are side views of an off-highway truck illustrating a sequence of process steps for designing a dual purpose body for the truck according to one aspect of the invention;

FIG. 13 is a side view of the off-highway truck of FIG. 12 illustrating the body fully loaded with material of relatively high density with the tailgate assembly in its out-of-service position.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
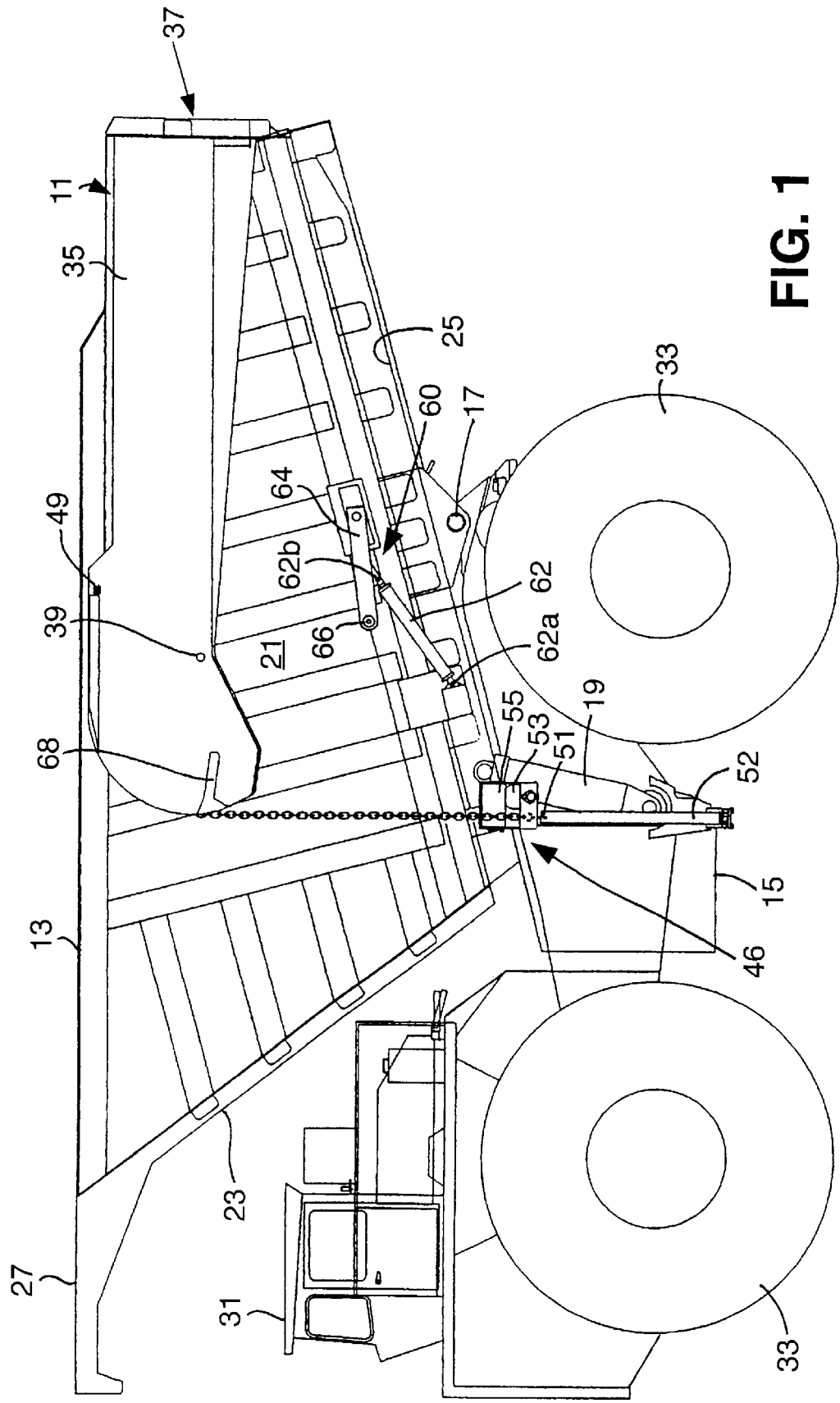
FIG. 1 is a side view of a heavy-duty, off-road truck and truck body in its lowered position incorporating a tailgate assembly according to the invention wherein the tailgate is in its closed, in-service position and the second tailgate rotation actuation mechanism is retracted.

Turning to the drawings, and referring first to FIG. 1, a heavy-duty, off-road truck 10 for hauling loads is illustrated with a tailgate assembly 11 mounted on the truck body 13. The truck body 13 is mounted on an off-road truck frame 15 for pivoting about an axis 17. A hydraulic piston 19 rotates the truck body 13 about the axis 17 between a lowered position for receiving a load in the truck body 13 and a raised position for dumping the load. Structurally, the truck body 13 typically consists of steel panels which form the shape of the body and beams which provide the structural framework for the body. The truck body 13 consists of side walls 21 (only one is shown in FIGS. 1–7), a front slope 23, a floor 25 and a canopy 27 integrally attached to the top of the front slope 23 and extending over the cab 31 of the heavy-duty, off-road truck. Tires 33 support the truck frame 15. The tailgate assembly 11 includes tailgate side beams 35 (only one is shown) which are connected to a tailgate rear section 37 and pivotally connected to the side walls 21 of the truck body 13 for rotation about an axis of rotation defined by the pivot 39.

Since the heavy-duty, off-road truck of the illustrative embodiment is generally symmetrical about its longitudinal axis, many of the elements identified in the side views of FIGS. 1–6 have complementary elements on the opposite side of the heavy-duty, off-road truck. For example, the truck body 13 has two opposing side walls 21 and the tailgate assembly 11 has two opposing tailgate side beams 35 and pivots 39. It will be understood that reference to plural elements where only one is shown (e.g., tailgate side beams 35 or side walls 21) indicates a complementary element is located on the side of the heavy-duty, off-road truck not shown.

The tailgate assembly 11 may be moved between an in-service, closed position (shown in FIG. 1), an in-service, open position (shown in FIGS. 2–3), and an out-of-service position (shown in FIGS. 5–6) by rotating the tailgate assembly 11 about its axis of rotation 39. In the in-service, closed position, the tailgate assembly 11 is in its lowered and closed position which increases the volumetric capacity of the truck body 13 and enables the heavy-duty, off-road truck 10 to haul larger volumes of material such as coal. In order to unload a load contained in the truck body 13, the hydraulic pistons 19 rotate the truck body 13 to the raised position shown in FIG. 2 so that the tailgate assembly 11 is positioned to the in-service, open position and the load may be dumped from the tilted truck body 13. In the out-of-service position, the tailgate assembly 11 is in a resting position on the canopy 27 of the truck body 13. By providing an out-of-service position for the tailgate assembly 11 atop the canopy 27, the truck body 13 can be quickly and easily converted to a lower volume capacity body for hauling overburden or other high density material.

In accordance with certain objects of the invention, means for rotating the tailgate assembly 11 between the in-service closed, in-service open and out-of-service positions is provided. The rotating means comprising a first tailgate actuation assembly 46, and a second tailgate actuation assembly 60 controls the rate of rotation of the tailgate assembly 11 as the tailgate assembly 11 moves along the arcuate path between the in-service, closed position shown in FIG. 1, the in-service open position shown in FIGS. 2–3, and the out-of-service position shown in FIGS. 5–6.

Figure 7:
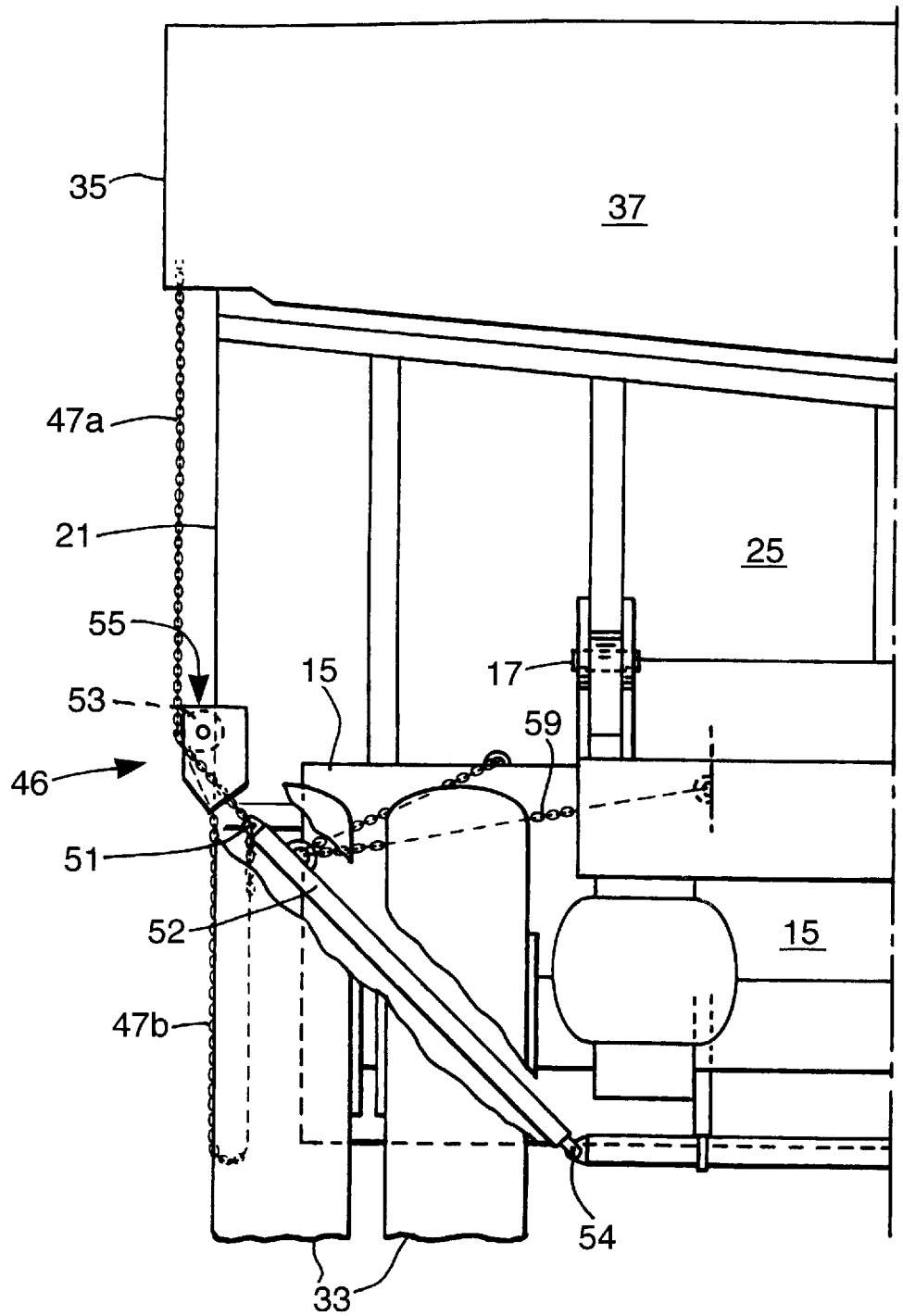
FIG. 7 is a partial cutaway of the rear of the heavy-duty, off-road truck and truck body in FIG. 1 showing the link mechanism which prevents the first tailgate rotation actuation cable or chain from dragging on the ground and/or interfering with the operation of the heavy-duty, off-road truck when the truck body is in its lowered position and the tailgate is in its out-of-service position.

In order to rotate the tailgate assembly 11 between the in-service, closed and the in-service, open positions, a first tailgate rotation actuation assembly generally depicted at 46 connects the truck frame 15 and the tailgate assembly 11 and rotates the tailgate assembly 11 in response to movement of the truck body 13 between its lowered and raised position on the truck frame 15. In the illustrated embodiment, the first tailgate rotation actuation assembly 46 comprises a cable or a chain 47 or the like having one end fixedly attached to fixed point 49 on the tailgate side beam 35. The other end of the cable or chain 47 may be fixedly attached to a fixed point such as link 52 which anchors the cable or chain 47 to the truck frame 15 when the truck body 13 is rotated and accordingly the tailgate assembly 11 is counter-rotated. In the illustrated embodiment, one end of the chain 47 is fixedly attached at pin 51 to the link 52 which is connected to the truck frame 15 at pin 54 although the other end of the chain 47 may also be fixedly attached directly to the truck frame 15 at pin 54 in other embodiments. Between the two endpoints of the cable or chain 47 is a biasing roller 53 carried on roller box 55 disposed on the side of the truck body 13. Referring to FIG. 7, it will be noted that the roller box 55 and roller 53 keep the chain 47 spaced from the sides 21 of the truck body 13 during the movement of the tailgate assembly 11 in response to raising and lowering the truck body 13.

Figure 2:
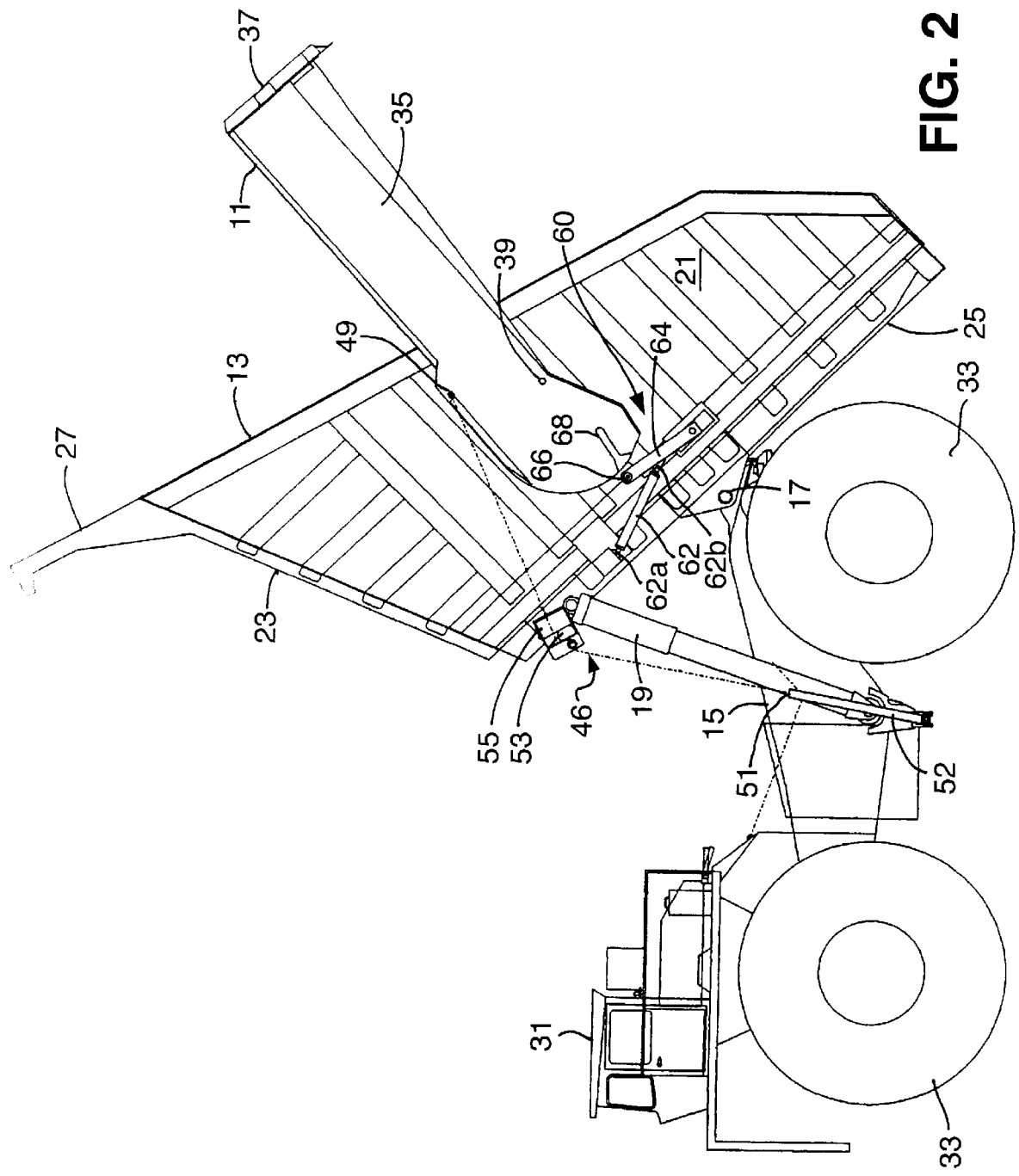
FIG. 2 is a side view of the heavy-duty, off-road truck and truck body in FIG. 1 wherein the truck body is in its raised position, the tailgate is in its open in-service position, and the second tailgate rotation actuation mechanism is retracted.

As the hydraulic cylinders 19 pivot the truck body 13 from the lowered position to its raised position, the cable or chain 47 is biased about the roller 53 and creates a counterclockwise torque on the tailgate assembly 11 which responds by rotating in a counterclockwise direction as illustrated in FIG. 2. The raising of the truck body 13 causes the tailgate assembly 11 to rotate from the in-service, closed position (FIG. 1) to the in-service, open position (FIG. 2).

In order to return the tailgate assembly 11 to the in-service, closed position (FIG. 1), the truck body 13 is lowered so that the torque exerted on the tailgate assembly 11 by the chain 47 is eliminated. When the hydraulic cylinders 19 lower the truck body 13, the weight of the tailgate assembly 11 overcomes the counterclockwise torque created by the chain 47, permitting the tailgate assembly 11 to return to the closed, in-service position. The lowering of the truck body 13 allows the tailgate assembly 11 to be lowered, under control of the cable or chain 47, to the in-service position (FIG. 1). It will be appreciated that the first tailgate actuation assembly 46 controls the rate of rotation of the tailgate assembly between the closed and open, in-service positions and permits the tailgate to experience fully controlled rotation.

In order to rotate the tailgate assembly between the open, in-service and the out-of-service positions, a second tailgate rotation actuation assembly, generally depicted at 60 in FIG. 1, is provided. The second tailgate rotation actuation assembly 60 is adapted to engage the tailgate assembly 11 in the open, in-service position as shown in FIG. 2, move the tailgate assembly 11 between the open, in-service and out-of-service positions, and lock the tailgate assembly 11 in the out-of-service position. In the illustrated embodiment, the second tailgate actuation assembly 60 is disposed on the truck body 13 and comprises actuating cylinders 62 having one end 62a pivotably connected to the truck body 13 and the other end 62b pivotably connected to cam levers 64 to position cams 66 into engagement with slots 68 disposed in the tailgate side beams 35. In the illustrated embodiment of the second tailgate actuation assembly 60, it will be seen that the cams 66 can engage the slots 68 when the tailgate assembly 11 is in the open, in-service position (shown in FIG. 2). The actuating cylinders 62 may be any actuator capable of rotating the tailgate assembly 11 between the open, in-service and out-of-service positions although it is preferred that they be hydraulic actuators.

Figure 3:
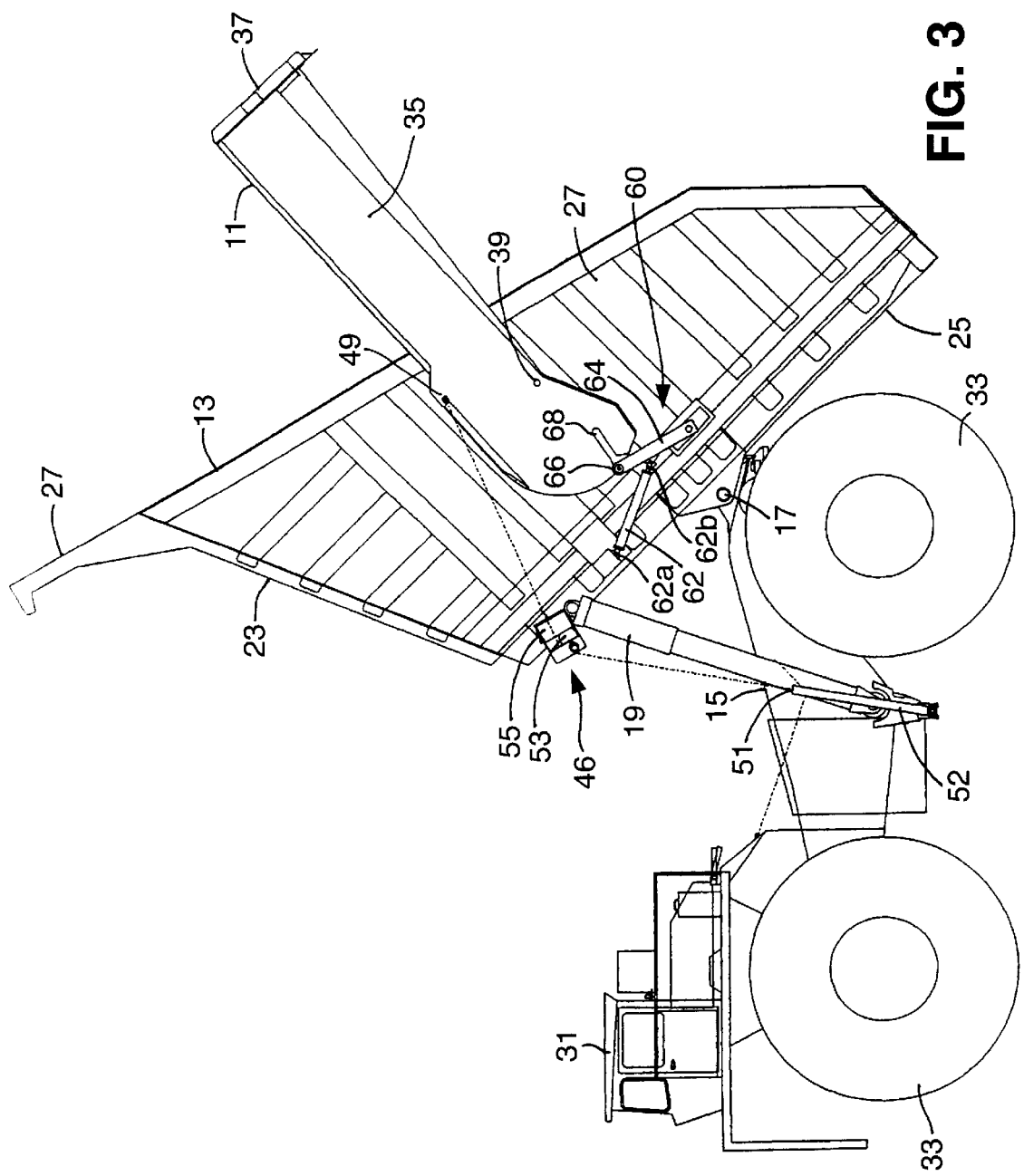
FIG. 3 is a side view of the heavy-duty, off-road truck and truck body in FIG. 1 wherein the truck body is in its raised position, the tailgate is in its open in-service position, and the second tailgate rotation actuation mechanism is beginning engagement of the tailgate.
Figure 4:
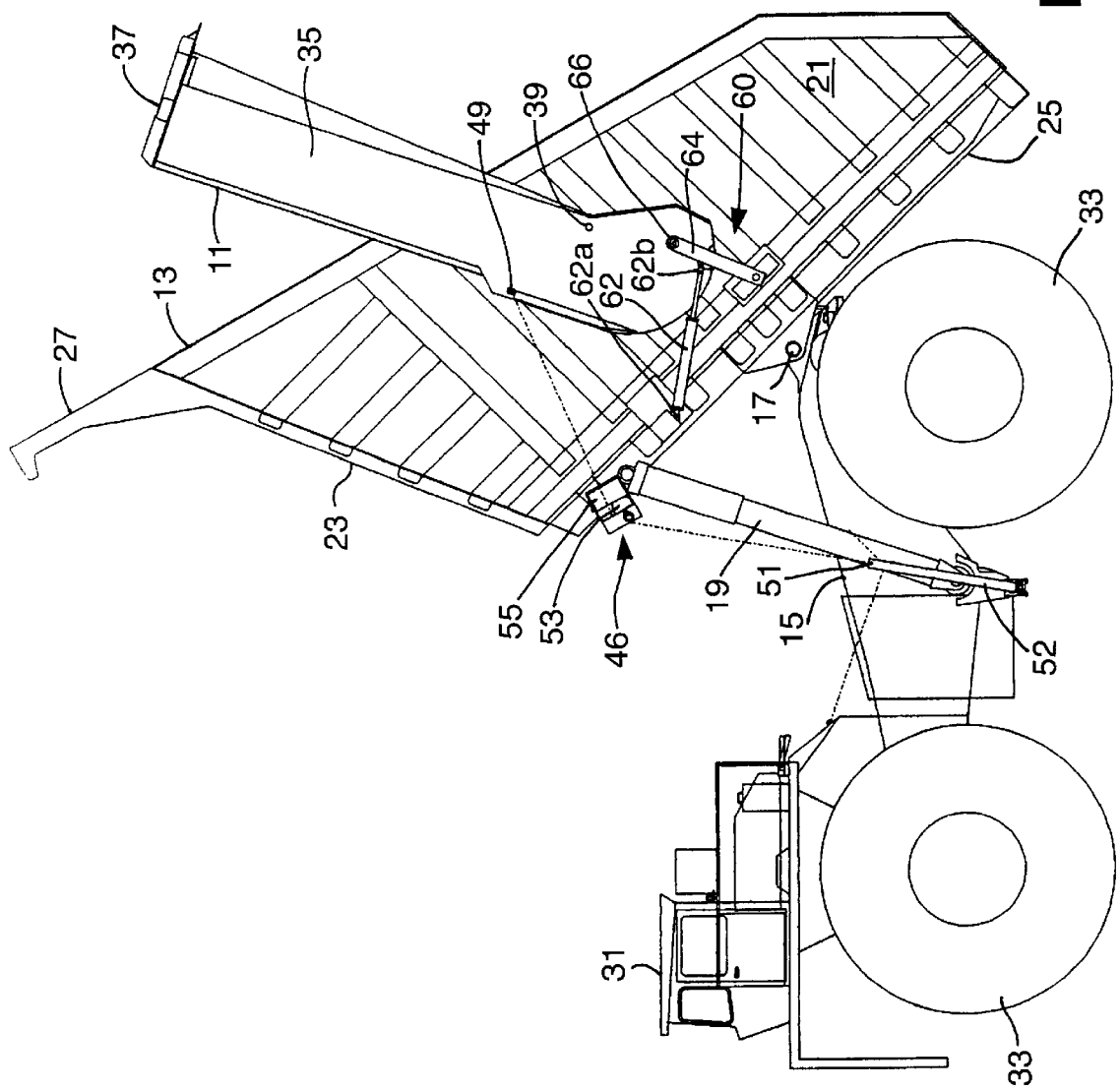
FIG. 4 is a side view of the heavy-duty, off-road truck and truck body in FIG. 1 wherein the truck body is in its raised position, the tailgate is between its open in-service position, and its out-of-service position, and the second tailgate rotation actuation mechanism has fully engaged the tailgate.
Figure 5:
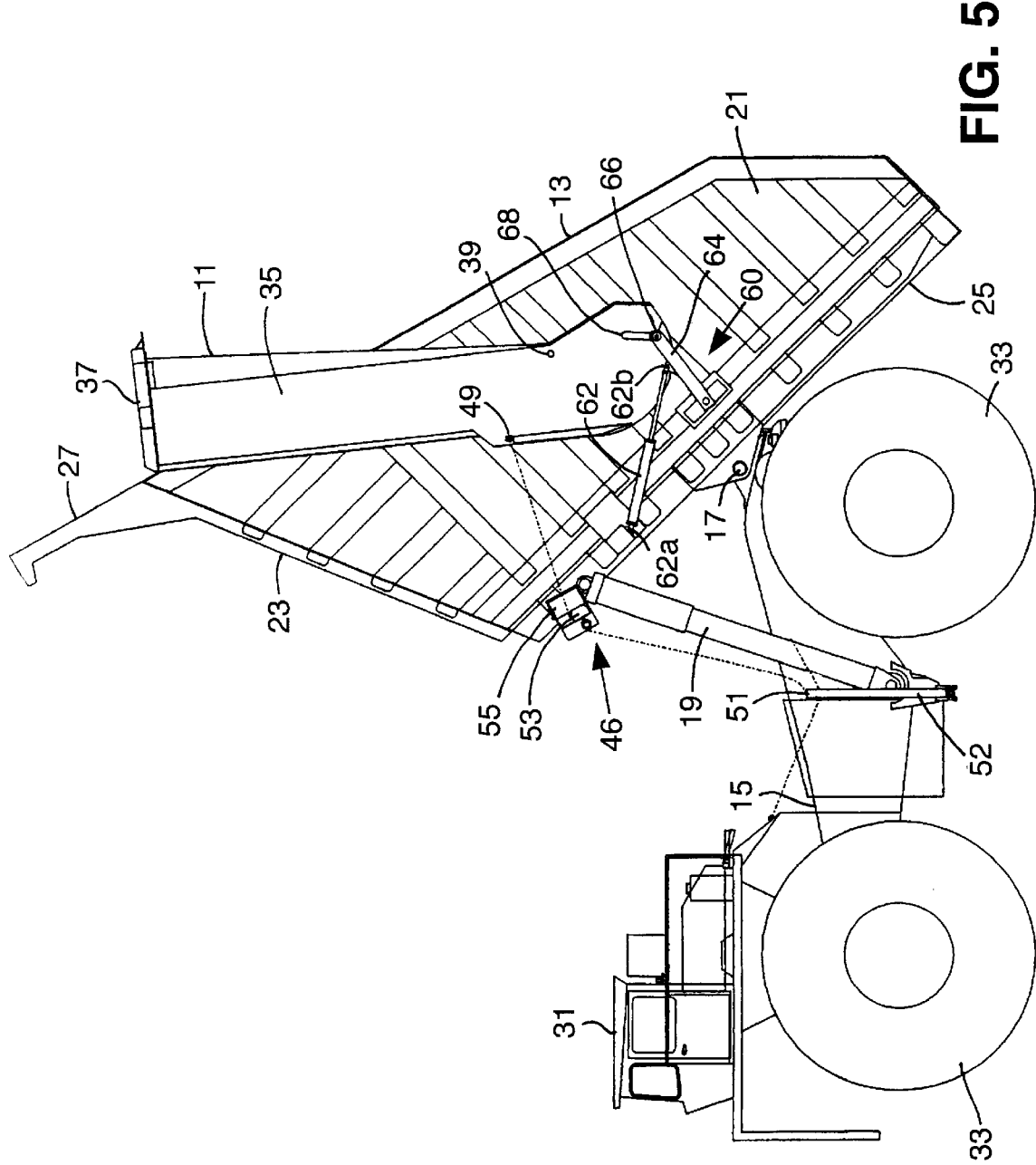
FIG. 5 is a side view of the heavy-duty, off-road truck and truck body in FIG. 1 wherein the truck body is in its raised position, the tailgate is in its out-of-service position, and the second tailgate rotation actuation mechanism engages the tailgate to hold the tailgate in the out-of-service position.
Figure 6:
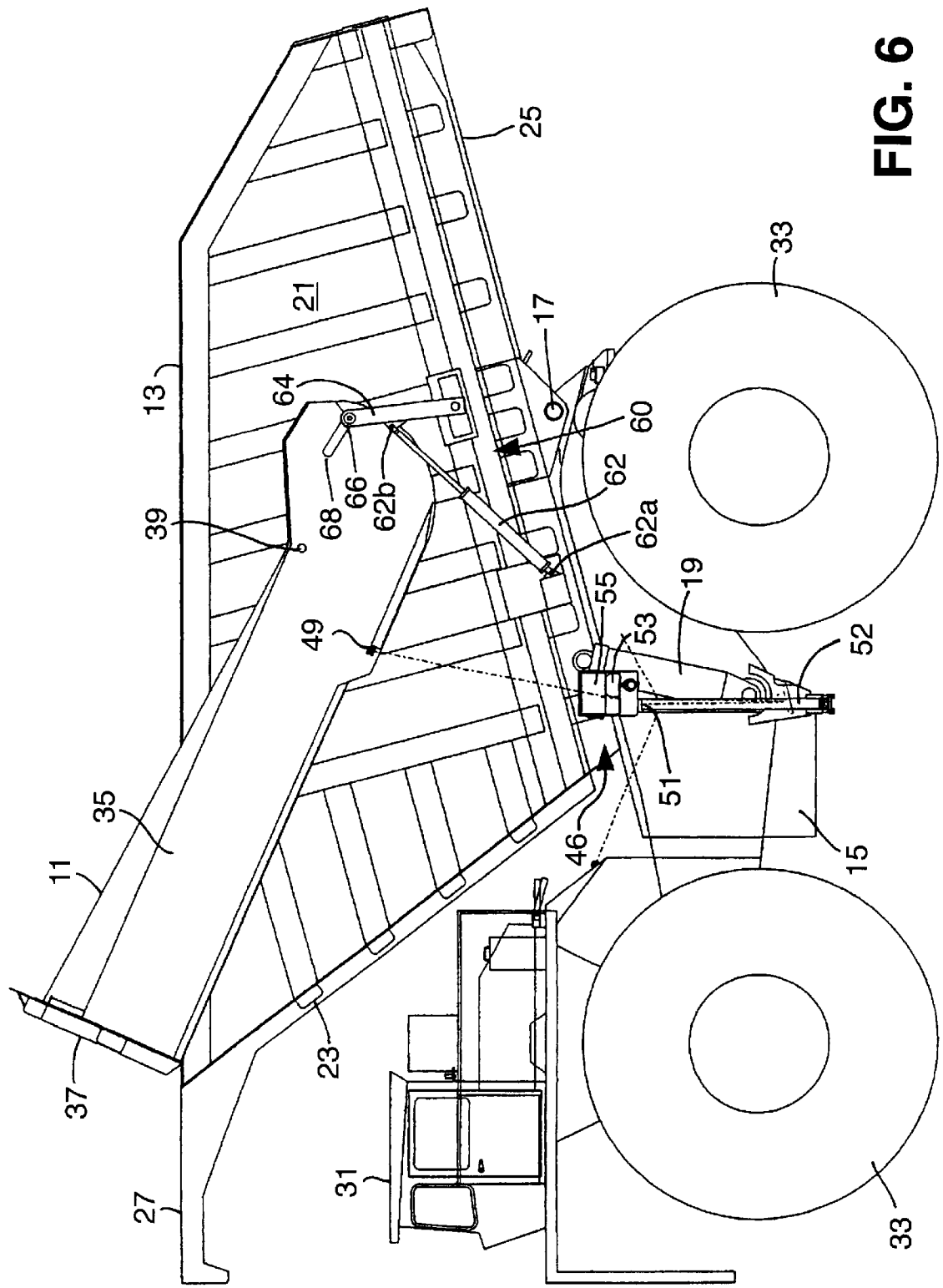
FIG. 6 is a side view of the heavy-duty, off-road truck and truck body in FIG. 1 wherein the truck body is in its lowered position, the tailgate is in its out-of-service position, and the second tailgate rotation actuation mechanism engages the tailgate to hold the tailgate in the out-of-service position.

After the tailgate assembly 11 is rotated to the open, in-service position by the first tailgate actuation assembly 46 as shown in FIG. 2, the actuating cylinder 62 is extended so as to rotate the cam lever 64 and the cam 66 in a clockwise direction into initial engagement with the slot 68 as shown in FIG. 3. FIG. 4 illustrates the cam 66 fully engaging the slot 68. The second tailgate actuation assembly 60 creates a counterclockwise torque on the tailgate assembly 11. In response to the clockwise rotation of the cam lever 64 and cam 66 within the slot 68 and the rotating torque created, the tailgate assembly 11 rotates about pivot 39 in a counterclockwise direction until the tailgate assembly 11 is in the out-of-service position shown in FIG. 5. The truck body 13 may be returned to its lowered position after the tailgate assembly 11 is locked in the out-of-service position or while the cam 66 has engaged the slot 68 and the tailgate assembly 11 is rotating to the front of the truck body 13. The second tailgate actuation assembly 60 securely locks the tailgate assembly 11 in the out-of-service position as shown in FIGS. 5–6.

By locking the tailgate assembly 11 in the out-of-service position, the second tailgate actuation assembly 60 prevents the tailgate assembly 11 from unintentionally and uncontrollably swinging back to its open in-service position. Without the locking mechanism, when the truck body 13 is in its raised position, a combination of circumstances, individually or combined, such as raising the truck body 13 on an adverse grade and rocking of the heavy-duty, off-road truck 10 to release load from the fully raised truck body 13, could create a significant risk of unintentional clockwise movement of the tailgate assembly 11 from the canopy 27. Under extreme circumstances the tailgate assembly 11 may even uncontrollably rotate to its in-service closed position.

In order to move the tailgate assembly 11 from its out-of-service position on the canopy 27 of the truck body 13 to first its in-service open position and then secondly its in-service, closed position, the truck body 13 is first raised to its fully raised position, then the actuating cylinder 62 is retracted, thereby unlocking the tailgate assembly 11. The retraction of the actuating cylinder 62 creates a counterclockwise rotation of cam lever 64 which creates a clockwise torque on the tailgate assembly 11 to rotate the tailgate assembly 11 in the clockwise direction as shown in FIGS. 4–5. When the tailgate assembly 11 reaches the in-service, open position in FIG. 3, the retracting cylinder 62 disengages the cam 66 from the slot 68 and the first tailgate actuation assembly 46 then lowers the tailgate assembly 11 from the in-service open to the in-service closed position as the truck body 13 is lowered to its fully down position described previously.

It should now be appreciated that the first tailgate actuation assembly 46 operates independently of the second tailgate assembly 60. Further, it will be appreciated that the tailgate assembly 11 of this invention permits low density materials to be loaded into truck body 13 and dumped by truck body 13 without modifications to the normal in-service tailgate assembly 11 operating cycle. It will also be appreciated that the illustrated embodiment of the second tailgate actuation assembly 60 can only engage the tailgate assembly 11 when the tailgate is in the in-service, open position.

It may be desirable to place a sensor 45 in the heavy-duty, off-road truck to indicate when the truck body is fully raised. Similarly, a sensor 45a may be disposed on the side walls 21 to indicate when the tailgate assembly 11 is positioned in the full-open, in-service, open position so that the cam 66 may properly engage the slot 68. In other embodiments which will be readily apparent to those skilled in the art, the second tailgate actuation assembly 60 may be modified to engage the tailgate assembly 11 in positions other than the in-service open position.

It should now be appreciated that the cable or chain 47 utilized to rotate the tailgate assembly 11 in the first tailgate actuation assembly 46 will be taut in some positions and, at other times, the chain 47, if connected to the truck frame 15 at pin 54, may be slack so as to drag on the ground or otherwise interfere with the operation of the heavy-duty, off-road truck. For example, when the tailgate assembly 11 is in the in-service, open position, the chain 47 would typically be relatively taut as shown in FIG. 2 whereas in the out-of-service position, the chain 47 would typically be relatively slack as shown in FIGS. 5–6. In accordance with another object of the invention, when the tailgate assembly 11 is in the out-of-service position, a chain support assembly is provided to prevent the cable or chain 47 from interfering with the operation of the heavy-duty, off-road truck 10. FIG. 7 illustrates one embodiment of a chain support assembly comprising a link 52 which connects the chain 47 and the truck frame 15. One end of the link is pivotally connected to the truck frame 15 at pin 54 and the other end of the link is fixedly connected to the chain 47 at pin 51. The link 52 is supported by a cable or chains 59 or the like which are connected to the truck frame 15. FIG. 7 shows a taut chain 47a against the biasing roller 53 and a slack chain 47b (in phantom) hanging from the link 52 at pin 51. The link 52 supports the slack chain 47b at pin 51 above the ground and in a spaced relation relative to the truck frame 15 so as to prevent the chain 47 from interfering with the operation of the heavy-duty, off-road truck 10. The link 52 also anchors the end of chain 47 at pin 51 during in-service tailgate assembly 11 operation when the truck body 13 is raised to create a rotating torque on the tailgate assembly 11.

From the foregoing illustrative embodiments, it will be appreciated that the tailgate assembly 11 can be alternatively placed in an in-service, closed position, an in-service, open position or an out-of service position on the canopy 27 of the truck body 13 by way of rotating the tailgate assembly 11 about the pivot 39. The means for rotating the tailgate assembly 11 comprises a first and second tailgate actuation means advantageously controls the rate of rotation of the tailgate assembly 11 throughout the entire arcuate path traveled by the tailgate assembly 11 to prevent uncontrolled free fall which may damage the tailgate assembly, the truck body 13 and the heavy-duty, off-road truck 10. Furthermore, the tailgate assembly 11 can be safely carried on the canopy 27 of the truck body 13 by locking the tailgate assembly 11 to the canopy with the second tailgate actuating assembly 60. By utilizing the invention to provide a tailgate assembly 11 with in-service and out-of-service positions, a more versatile heavy-duty, off-road truck is provided which can be safely used for both hauling overburden and coal at a mining site. The present invention also permits a single operator to operate the heavy-duty, off-road truck because the controls for the tailgate assembly 11 rotating means including the first tailgate rotation actuation assembly 46 and the second tailgate rotation assembly 60 are located in the cab 31. Since the operator does not have to leave the cab to manipulate the chain assembly, the safety of the heavy-duty, off-road truck is also enhanced.

Turning to another aspect of the invention, the truck body 13 is designed in order to complement the roll-over tailgate assembly 11 so that heaped loads of overburden or coal tend to have a center of gravity that best matches the intended load distribution contemplated by the design of the chassis or frame 15. Such a design approach results in the body 13 having a dual purpose—i.e., hauling overburden or coal. Prior to the invention, the tailgate assembly 11 was retrofitted to a truck body whose design contemplated only the haulage of one type of material. In this regard, these bodies are typically the bodies provided with the truck 10 as part of the original equipment supplied by the manufacturer.

In the aspect of the invention illustrated in FIGS. 8–11, the body 13 of the truck 10 is designed to alternatively accommodate and hold heaped overburden or coal. As explained previously, the different densities of overburden and coal result in different maximum volumes for loads of these materials. By the design process outlined in FIGS. 8–11, the body 13 is shaped and dimensioned to accommodate both types of loads in a manner that best assures proper weight distribution.

Figure 8A:
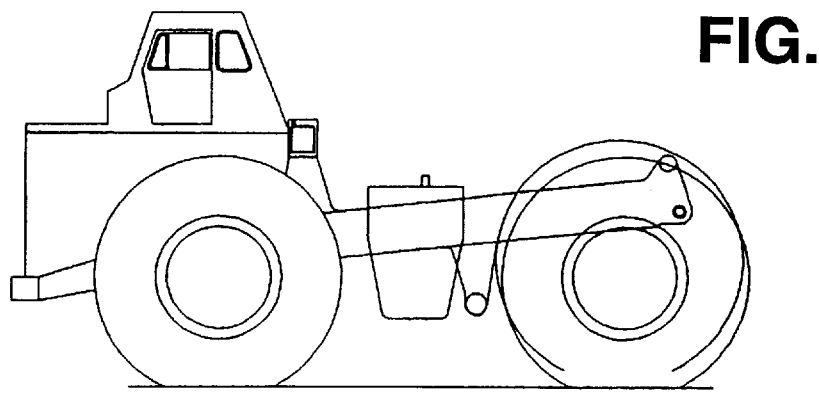
Figure 8B:
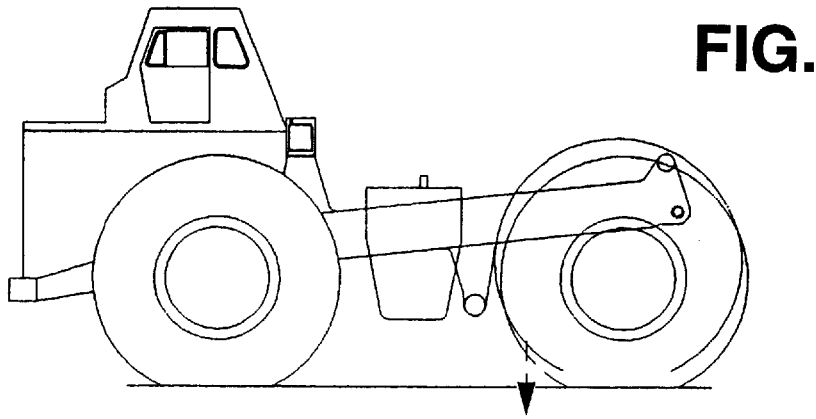

Turning to FIG. 8A, the first step in the design of the dual purpose body 13 is to determine the dimensions of the truck chassis or frame 15. Using the values of the empty and loaded weights of the truck provided by the truck manufacturer, the center of gravity for the load is determined as illustrated in FIG. 8B. The center of gravity is located using conventional moment diagrams. These diagrams assume the body being designed having a similarly positive center of gravity as the original body supplied by the manufacturer, which has proven to be a reasonable assumption from applicant's experience.

Figure 9A:
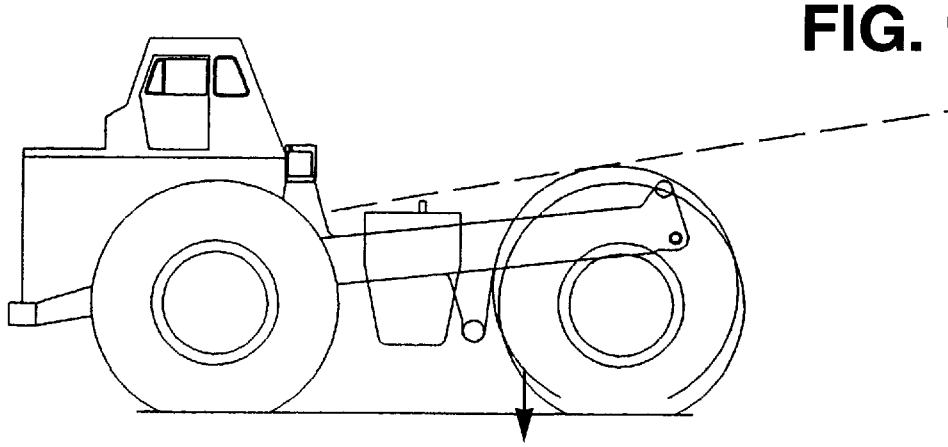
Figure 9B:
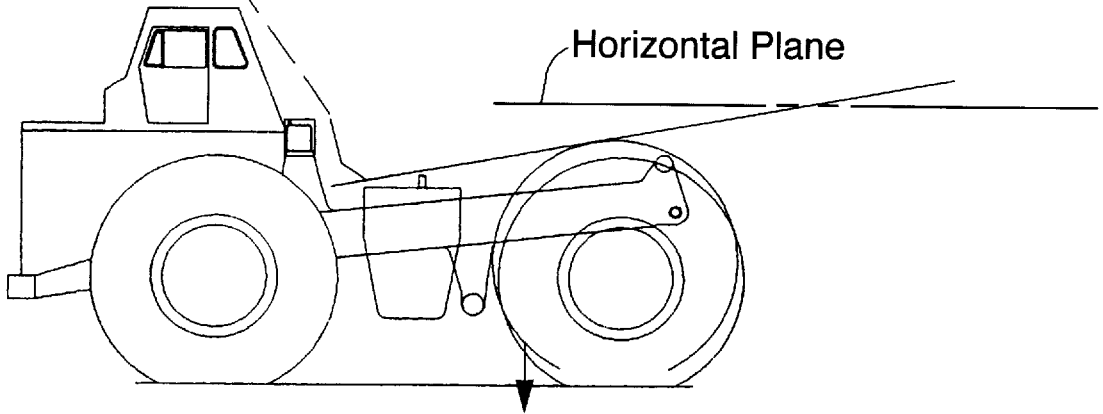

In FIG. 9A, a slope is established for the plane of the floor 25 of the body 13. In general, the slope of the floor plane is established to provide a incline with respect to a horizontal plane as illustrated in FIG. 9B and while maintaining appropriate clearances over the chassis 15. In FIG. 9B, a plane is established for the front slope 23 of the body 13. Like the slope of the floor 23, the angle of the front slope 23 is limited by clearances required between the front slope and the cab 31.

In steps A and B of FIG. 10A, the density of the overburden or heavy material is calculated and the natural slope of the heaped overburden or heavy material is determined—e.g., 2:1, meaning a slope of approximately 26 degrees. With the density and natural slope of the heap for a load of overburden, a profile of a full load is added in FIG. 10B. The slope angles and lengths of the floor 25 and front slope 23 are adjusted as indicated by the arrows in order to locate the center of gravity for the full load close to the center of gravity contemplated in the design of the chassis 15. Using an iterative process, the width of the body is also adjusted with the slopes and lengths of the floor 25 and front slope 23 in order to minimize the height of the profile for a full load. Minimizing the height of the load lowers the center of gravity of the load and thereby helps the stability of the vehicle. Obviously, the wider the body, the lower the center of gravity. As a practical limit, however, the body should not be significantly wider than the overall width of the rear axle measured from the outer edges of the tires. As indicated by step C in FIG. 10A, applicant has typically adjusted the width of the body to be approximately 100–115 percent of the overall rear axle tire width.

In FIG. 11A, steps A and B are performed in order to determine the density of the coal or light material to be loaded by the body 13 and to determine the natural slope of the heaped light material—e.g., 3:1, meaning an angle or incline of approximately 18 degrees. With values for the density and natural slope of the heap, a profile for the loaded coal or light material is established in FIG. 11B. With the density and natural slope of the heap known, the center of gravity of the load of light material is adjusted to be approximately coincident with the anticipated center of gravity contemplated by the design of the chassis 15. The center of gravity for the load is adjusted by changing the location of the tailgate 37 as indicated in FIG. 11A, by adjusting the extent of the canopy 27 and the heights of the side walls 21. Also, the canopy 27 may include a front shield 99 to contain the load at its peak as indicated by the arrows. The height of the shield 99 can also be adjusted to help in moving the center of gravity of the load.

Figure 11C:
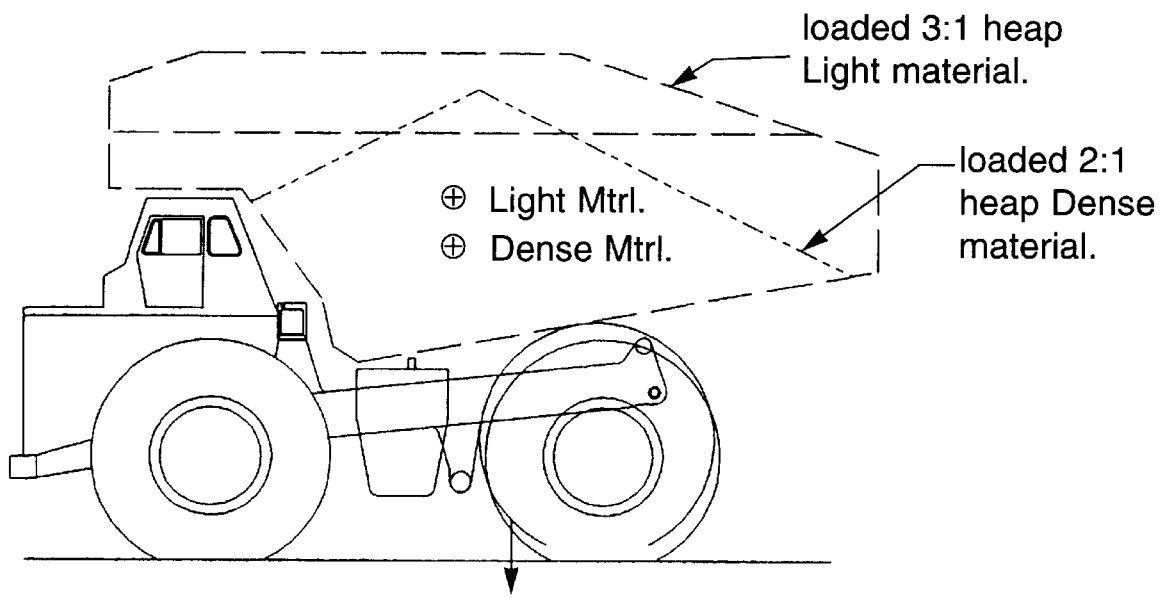

FIG. 11C illustrates the final design of the body 13 that, according to the foregoing design approach, alternatively loads the light and dense material in a manner that results in the center of gravity of the load approximating the location of the center of gravity expected by the design of the chassis 15.

Figure 12:
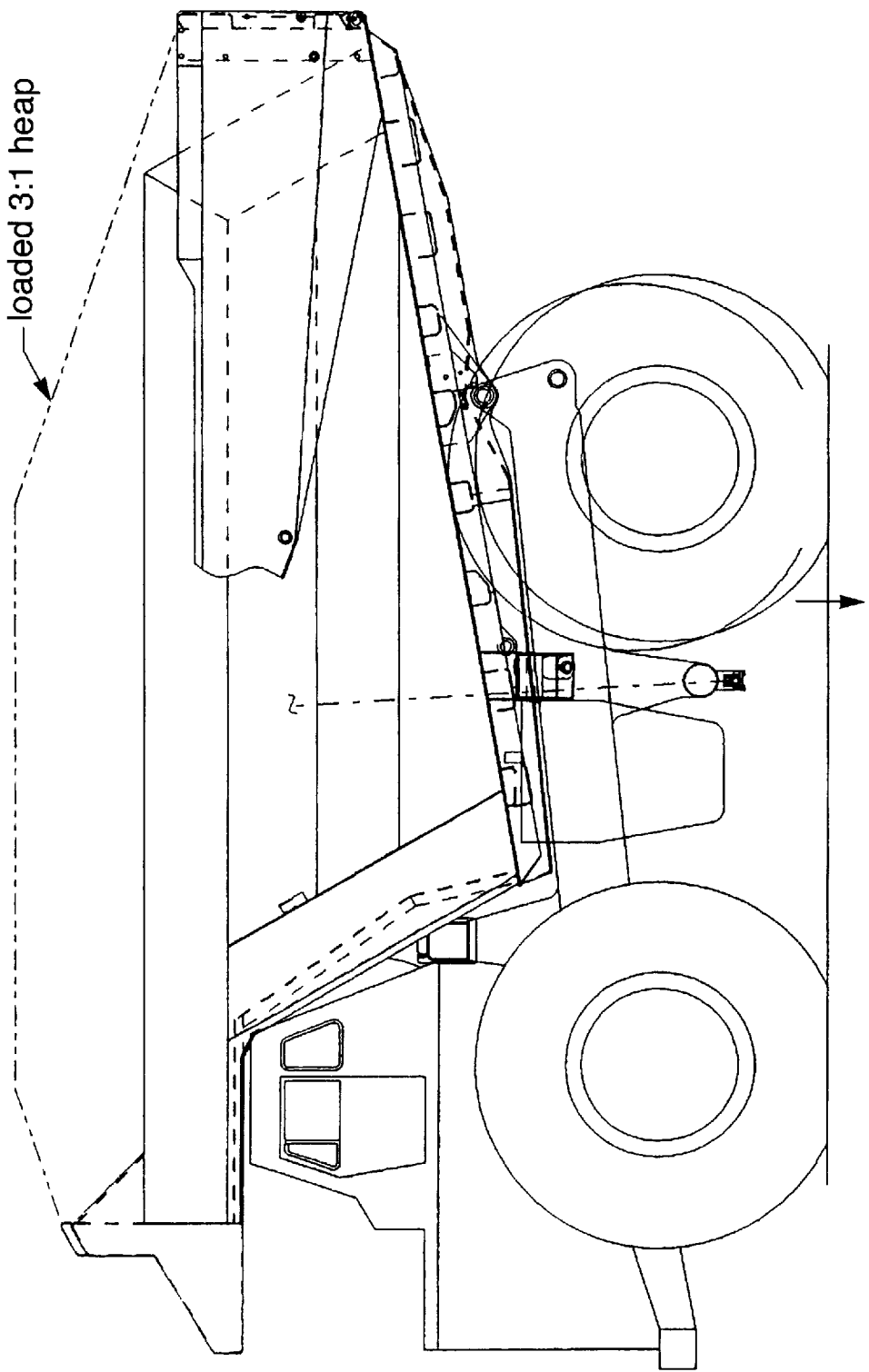
FIG. 12 is a side view of the off-highway truck of FIGS. 8–11 illustrating the final design of the body fully loaded with material of relatively low density with the tailgate assembly in its in-service.

Turning to FIG. 12, a body 13 designed in keeping with the foregoing design approach is illustrated with the rollover tailgate of FIGS. 1–7. The rollover mechanism has been omitted in this illustration. The tailgate assembly 11 is illustrated in its closed position with the body 13 loaded with light material such as coal. In FIG. 13, the same body 13 is illustrated with the tailgate assembly 11 rotated into its out-of-service position as contemplated by the invention. Now the body 13 is loaded with the heavy material or overburden, which according to the design approach in FIGS. 8–11 provides a load that naturally tends to have a center of gravity at a position along the chassis contemplated by the chassis design. The out-of-service position of the rollover tailgate 11 prevents adverse forward loading and the open end of the body 13 prevents adverse rearward loading, which results in the loading of the heavy material in a desired and predictable manner.

Figure 14A:
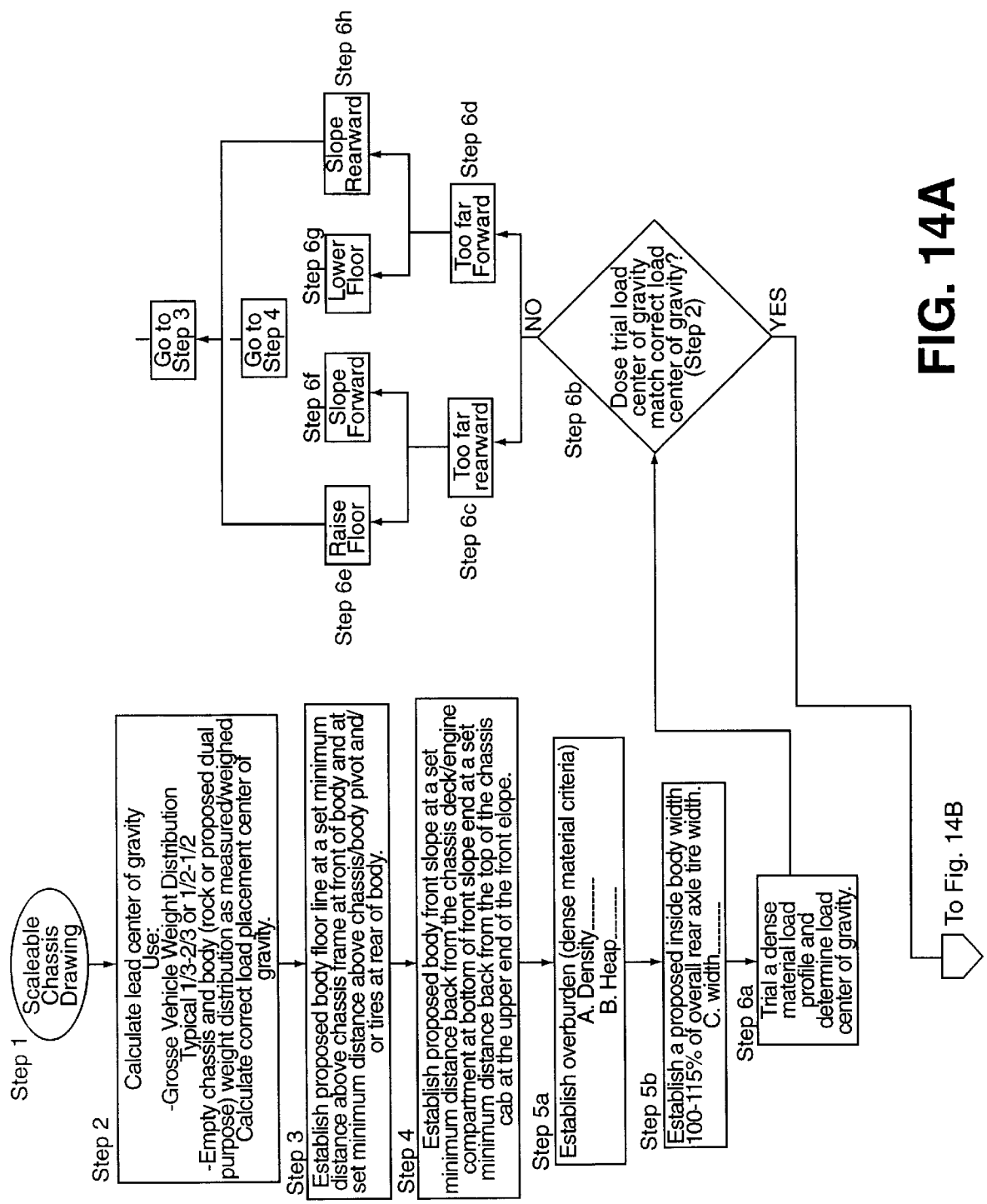
FIGS. 14A–14B are a flow diagram of the steps illustrated in FIGS. 8–11.
Figure 14B:
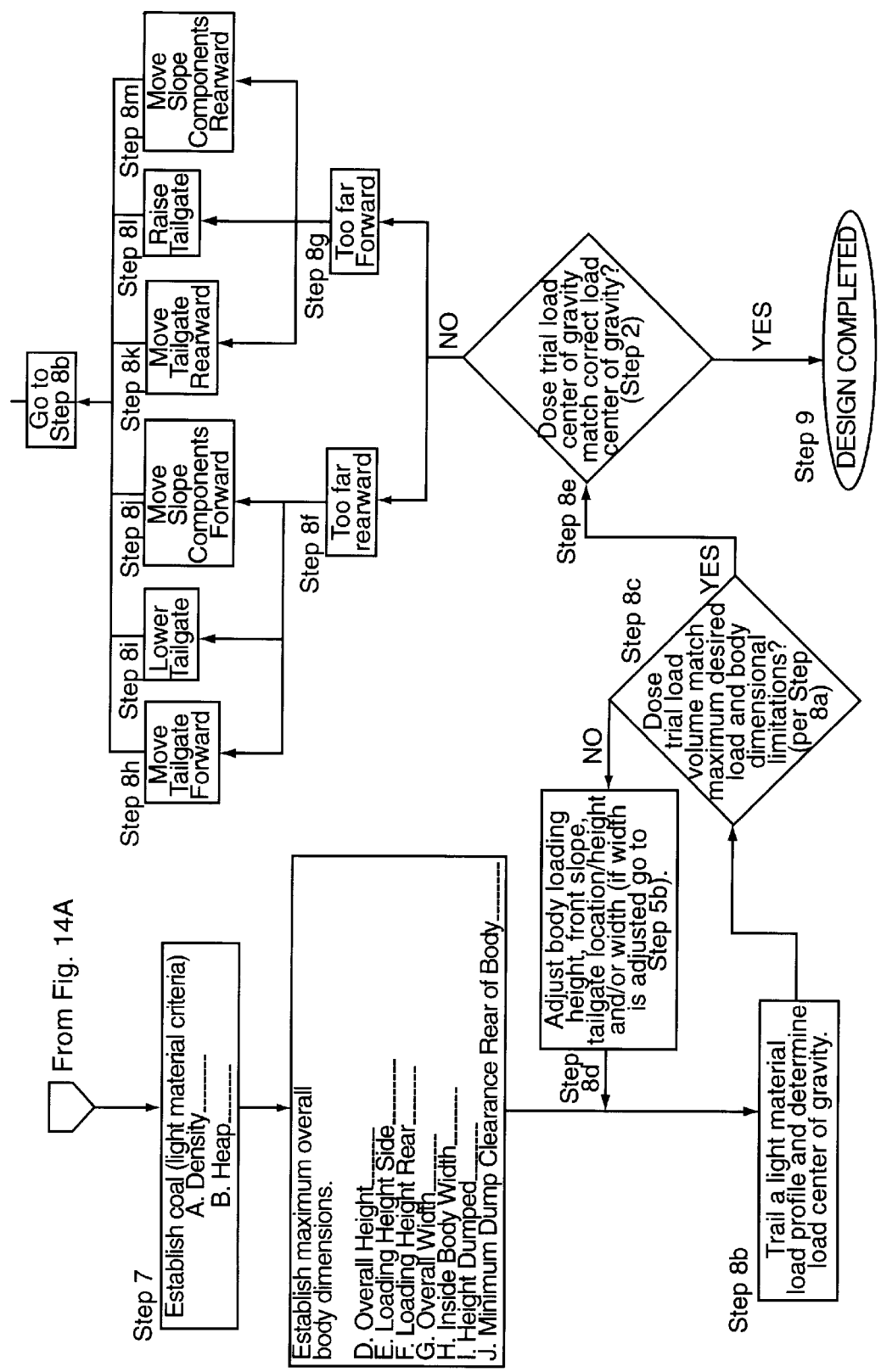

FIGS. 14A and 14B are a flow diagram for the steps illustrated by the drawings of FIGS. 8–11. The steps in the flow diagram of FIGS. 14A and 14B are numbered to correspond to the numbering of the steps in FIGS. 8–11. For example, starting at step 6b in the flow diagram of FIG. 14A illustrates the iterative process for determining the width of the body by adjusting the floor line and the front slope line in conjunction with adjustments to the inside body width in order to achieve the desired location of the center of gravity for dense material. Steps 7 and 8 FIG. 14B adjust the heights and position of the different parts of the body necessary to accommodate the larger volume of the light material while checking the correlation of the load's center of gravity to a desired center of gravity in step 8e.

From the foregoing, it will be appreciated that the body 13 of the truck 10 can be designed to complement the tailgate assembly 11 so as to provide a dual-purpose body that is shaped to best accommodate alternative densities of materials while maintaining a distribution of these materials that results in a center of gravity of the load that is proximate to a predetermined desired center of gravity (e.g., the center of gravity assumed by the truck manufacturer in designing the chassis of the truck).

I claim as my invention:

1. A load-carrying body for a truck comprising in combination: a floor two opposing side walls spanned by a front wall, a tailgate assembly comprising side beams pivotally mounted to the two opposing side walls and a rear section spanning opposing ends of the side beams, an apparatus for rotating the tailgate assembly between in-service and out-of-service positions, the floor, front wall and side walls having shapes and sizes such that (a) with the tailgate assembly in the in-service position, normal loading of the body with light density material locates a center of gravity of a fill load of the material in proximate vertical alignment with a predetermined point and (b) with the tailgate assembly in the out-of-service position, normal loading of the body with heavy density material locates a center of gravity of a full load of the material in proximate vertical alignment with the predetermined point.

2. The body of claim 1 wherein the predetermined point is a preferred location of a center of gravity of the load.

3. The body of claim 1 wherein the floor is inclined with respect to a horizontal plane.

4. A body for a haulage vehicle having a tailgate assembly from which the body has a first load capacity when the tailgate assembly is in an in, service position and a second, lesser load capacity when the tailgate assembly is in an out-of-service position, the body made by the following process:

determining a desired distribution of weight on a chassis of the haulage vehicle, establishing a line for a floor and a line for a front wall of the body, adjusting a first set of parameters of the body such that normal loading of the body results in the desired distribution of weight on the chassis for a load of high-density material carried by the body with the tailgate assembly in the out-of-service position, where the parameters include the following: (a) the slope of the floor, and (b) the slope of the front wall;

adjusting a second set of parameters of the body such that normal loading of the body results in the desired distribution of weight on the chassis for a load of low-density material carried by the body with the tailgate assembly in the in-service position, where the parameters include the following: (a) a height of lateral sidewalls of the body, (b) a location of a rear section of the tailgate assembly when the assembly is in its in-service positions and, (c) a position of the front wall above where the high-density material contacts the front wall; and producing the body in accordance with the values of the first and second sets of parameters.

5. The body of claim 4 wherein the centers of gravity for the low and high-density materials are approximately aligned.

6. The body of claim 4 wherein the tailgate assembly in its out-of-service position inhibits abnormal loading of the high-density material.

7. The body of claim 4 wherein a rear end of the floor for the body is determined by identifying where on the floor a profile of the high-density material load ends.

8. A body for a haulage vehicle having a tailgate assembly from which the body has a first load capacity when the tailgate assembly is in an in-service position and a second, lesser load capacity when the tailgate assembly is in an out-of-service position, the body made by the following process:

determining a desired distribution of weight on a chassis of the haulage vehicle;

establishing a line for a floor and a line for a front wall of the body;

adjusting a first set of parameters of the body such that normal loading of the body results in the desired distribution of weight on the chassis for a load of high-density material carried by the body with the tailgate assembly in the out-of-service position, where the parameters include the following: (a) a position of the floor, (b) a position of sidewalls and © a position of the front wall;

adjusting a second set of parameters of the body such that normal loading of the body results in the desired distribution of weight on the chassis for a load of low-density material carried by the body with the tailgate assembly in the in-service position where the parameters include the following: (a) a position of sidewalls of the body above where the high-density material contacts the body, (b) a position of the tailgate assembly when the assembly is in its in-service position, and (c) a position of the front wall above where the high-density material contacts the body, and producing the body in accordance with the values of the first and second sets of parameters.

9. The body of claim 8 wherein the position of sidewalls of the body includes a height of the sidewalls.

10. The body of claim 9 wherein the position of sidewalls of the body also includes a distance between them.

11. The body of claim 8 including the step of adjusting the positions of (a) the sidewalls of the body, (b) the tailgate assembly in at least one of its service positions, (c) the front wall of the floor of the body to provide the lowest practical vertical location for the center of gravity of the load.

12. The body of claim 11 including the step of adjusting the position of a canopy of the body.

13. The body of claim 8 wherein the parameters of the body used to determine the desired location of the center of gravity for the normal loading of low-density material carried by the body with the tailgate assembly in the in-service position includes a position of a canopy of the body.

14. The body of claim 8 wherein the position of the floor includes a slope and a length of the floor.

15. The body of claim 8 wherein the position of the front wall includes a slope and a height of the front wall.

16. The body of claim 8 wherein the position of the tailgate assembly includes a height of the rear section of the tailgate.

17. The body of claim 8 wherein the position of sidewalls of the body includes a distance between them.

18. The body of claim 8 wherein the step of adjusting the position of the tailgate assembly in its in-service position includes adjusting a fore-aft position of the rear section of the tailgate assembly.

* * * * *